(12) United States Patent
Theertham

(10) Patent No.: US 10,774,653 B2
(45) Date of Patent: Sep. 15, 2020

(54) COMPOSITE GAS TURBINE ENGINE COMPONENT WITH LATTICE STRUCTURE

(71) Applicant: United Technologies Corporation, Farmington, CT (US)

(72) Inventor: Arun K. Theertham, Rocky Hill, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 73 days.

(21) Appl. No.: 16/216,012

(22) Filed: Dec. 11, 2018

(65) Prior Publication Data
US 2020/0182066 A1  Jun. 11, 2020

(51) Int. Cl.
 *F01D 5/14* (2006.01)
 *F01D 5/28* (2006.01)
 *F01D 5/18* (2006.01)

(52) U.S. Cl.
 CPC .......... *F01D 5/147* (2013.01); *F01D 5/143* (2013.01); *F01D 5/18* (2013.01); *F01D 5/282* (2013.01); *F05D 2220/32* (2013.01); *F05D 2300/6033* (2013.01)

(58) Field of Classification Search
 CPC . F01D 5/143; F01D 5/147; F01D 5/18; F01D 5/282; F01D 11/008; F05D 2220/32; F05D 2300/6033
 See application file for complete search history.

(56) References Cited

U.S. PATENT DOCUMENTS

| | | |
|---|---|---|
| 2,343,918 A | 3/1944 | McCoy |
| 3,584,972 A | 6/1971 | Bratkovich et al. |
| 3,694,104 A | 9/1972 | Erwin |

(Continued)

FOREIGN PATENT DOCUMENTS

| | | |
|---|---|---|
| DE | 10261071 | 7/2004 |
| EP | 0475658 | 3/1992 |

(Continued)

OTHER PUBLICATIONS

International Search Report and Written Opinion for PCT Application No. PCT/US2014/050614 completed Nov. 19, 2014.

(Continued)

*Primary Examiner* — Igor Kershteyn
(74) *Attorney, Agent, or Firm* — Carlson, Gaskey & Olds, P.C.

(57) ABSTRACT

An assembly for a gas turbine engine according to an example of the present disclosure includes, among other things, an airfoil that has an airfoil section extending from a root section. The airfoil section extends between a leading edge and a trailing edge in a chordwise direction and extending between a tip portion and the root section in a radial direction. The airfoil section defines a pressure side and a suction side separated in a thickness direction. A platform is dimensioned to receive a retention pin to mount the platform to a rotatable hub. At least one of the airfoil and the platform includes a plurality of composite layers that define an internal cavity. A lattice structure in the internal cavity extends between the plurality of composite layers. The lattice structure has a plurality of branches that extend from a plurality of nodes.

20 Claims, 8 Drawing Sheets

(56) References Cited

U.S. PATENT DOCUMENTS

| | | |
|---|---|---|
| 3,864,199 A | 2/1975 | Meginnis |
| 3,869,778 A | 3/1975 | Yancey |
| 3,900,629 A | 8/1975 | Spencer |
| 4,004,056 A | 1/1977 | Carroll |
| 4,091,146 A | 5/1978 | Darrow et al. |
| 4,168,348 A | 9/1979 | Bhangu et al. |
| 4,269,032 A | 5/1981 | Meginnis et al. |
| 4,292,376 A | 9/1981 | Hustler |
| 4,302,940 A | 12/1981 | Meginnis |
| 4,359,181 A | 11/1982 | Chisholm |
| 4,407,632 A | 10/1983 | Liang |
| 4,440,834 A | 4/1984 | Aubert et al. |
| 4,642,993 A | 2/1987 | Sweet |
| 4,643,647 A | 2/1987 | Perry |
| 4,751,962 A | 6/1988 | Havekost et al. |
| 4,815,939 A | 3/1989 | Doble |
| 5,038,014 A | 8/1991 | Pratt et al. |
| 5,102,300 A | 4/1992 | Violette et al. |
| 5,129,787 A | 7/1992 | Violette et al. |
| 5,165,860 A | 11/1992 | Stoner et al. |
| 5,193,611 A | 3/1993 | Hesselgreaves |
| 5,240,377 A | 8/1993 | Farr |
| 5,353,867 A | 10/1994 | Jaspers |
| 5,370,449 A | 12/1994 | Edelen et al. |
| 5,370,499 A | 12/1994 | Lee |
| 5,545,003 A | 8/1996 | O'Connor et al. |
| 5,558,497 A | 9/1996 | Kraft et al. |
| 5,562,419 A | 10/1996 | Crall et al. |
| 5,607,778 A | 3/1997 | Padden |
| 5,660,523 A | 8/1997 | Lee |
| 5,752,801 A | 5/1998 | Kennedy |
| 5,791,879 A | 8/1998 | Fitzgerald et al. |
| 5,837,960 A | 11/1998 | Lewis et al. |
| 5,839,882 A | 11/1998 | Finn et al. |
| 5,960,863 A | 10/1999 | Hua |
| 5,975,841 A | 11/1999 | Lindemuth et al. |
| 6,039,542 A | 3/2000 | Schilling et al. |
| 6,126,396 A | 10/2000 | Doughty et al. |
| 6,167,952 B1 | 1/2001 | Downing |
| 6,213,720 B1 | 4/2001 | Farmer |
| 6,235,370 B1 | 5/2001 | Merrill et al. |
| 6,391,251 B1 | 5/2002 | Keicher et al. |
| 6,397,922 B1 | 6/2002 | Sachs et al. |
| 6,412,541 B2 | 7/2002 | Roesler et al. |
| 6,454,536 B1 | 9/2002 | Evans et al. |
| 6,508,623 B1 | 1/2003 | Shiozaki et al. |
| 6,511,762 B1 | 1/2003 | Lee et al. |
| 6,599,568 B2 | 7/2003 | Lee et al. |
| 6,617,003 B1 | 9/2003 | Lee et al. |
| 6,629,559 B2 | 10/2003 | Sachs et al. |
| 6,669,447 B2 | 12/2003 | Norris et al. |
| 6,761,956 B2 | 7/2004 | Lee et al. |
| 6,872,340 B2 | 3/2005 | Cundiff et al. |
| 6,955,523 B2 | 10/2005 | McClelland |
| 7,029,232 B2 | 4/2006 | Tuffs et al. |
| 7,048,986 B2 | 5/2006 | Shah et al. |
| 7,063,131 B2 | 6/2006 | Northrop |
| 7,070,390 B2 | 7/2006 | Powell |
| 7,070,853 B2 | 7/2006 | Paul |
| 7,112,044 B2 | 9/2006 | Whitehead et al. |
| 7,121,800 B2 | 10/2006 | Beattie |
| 7,121,801 B2 | 10/2006 | Surace et al. |
| 7,125,225 B2 | 10/2006 | Surace et al. |
| 7,141,812 B2 | 11/2006 | Appleby et al. |
| 7,144,220 B2 | 12/2006 | Marcin, Jr. |
| 7,153,464 B2 | 12/2006 | Millard et al. |
| 7,204,089 B2 | 4/2007 | Schreiber |
| 7,217,093 B2 | 5/2007 | Propheter et al. |
| 7,270,517 B2 | 9/2007 | Garner |
| 7,294,164 B2 | 11/2007 | Merkel |
| 7,328,580 B2 | 2/2008 | Lee et al. |
| 7,402,335 B2 | 7/2008 | Bolms et al. |
| 7,478,994 B2 | 1/2009 | Cunha et al. |
| 7,500,828 B2 | 3/2009 | Landis |
| 7,503,750 B1 | 3/2009 | Violette |
| 7,540,710 B2 | 6/2009 | Grote et al. |
| 7,597,533 B1 | 10/2009 | Liang |
| 7,658,590 B1 | 2/2010 | Spanks |
| 7,665,956 B2 | 2/2010 | Mitchell et al. |
| 7,670,675 B2 | 3/2010 | Heselhaus |
| 7,717,677 B1 | 5/2010 | Liang |
| 7,775,766 B2 | 8/2010 | Meier et al. |
| 7,785,098 B1 | 8/2010 | Appleby et al. |
| 7,810,552 B2 | 10/2010 | Slaughter |
| 7,828,526 B2 | 11/2010 | Cairo et al. |
| 7,857,588 B2 | 12/2010 | Propheter-Hinckley et al. |
| 7,866,372 B2 | 1/2011 | Slaughter |
| 7,866,377 B2 | 1/2011 | Slaughter |
| 7,968,144 B2 | 6/2011 | James et al. |
| 8,052,378 B2 | 11/2011 | Draper |
| 8,052,389 B2 | 11/2011 | Kopmels |
| 8,061,997 B2 | 11/2011 | Le Hong et al. |
| 8,079,821 B2 | 12/2011 | Campbell et al. |
| 8,167,573 B2 | 5/2012 | Merrill et al. |
| 8,182,228 B2 | 5/2012 | Riley et al. |
| 8,241,003 B2 | 8/2012 | Roberge |
| 8,257,809 B2 | 9/2012 | Morrison et al. |
| 8,327,911 B2 | 12/2012 | Kush et al. |
| 8,500,410 B2 | 8/2013 | De Moura et al. |
| 8,694,895 B2 | 4/2014 | Sanchez et al. |
| 8,919,696 B2 | 12/2014 | Lonsdorfer et al. |
| 9,370,921 B2 | 6/2016 | Butler et al. |
| 9,470,095 B2 | 10/2016 | Propheter-Hinckley et al. |
| 9,506,353 B2 | 11/2016 | Schwarz et al. |
| 9,587,496 B2 | 3/2017 | Collins et al. |
| 9,657,577 B2 | 5/2017 | Weisse |
| 9,739,157 B2 * | 8/2017 | Uskert ............... F01D 5/18 |
| 10,035,309 B2 | 7/2018 | McCarville et al. |
| 2005/0045306 A1 | 3/2005 | Petervary et al. |
| 2006/0099074 A1 | 5/2006 | Kopmels |
| 2006/0251515 A1 | 11/2006 | Landis |
| 2006/0285975 A1 | 12/2006 | Landis |
| 2007/0031252 A1 | 2/2007 | Walters et al. |
| 2007/0214759 A1 | 9/2007 | Merkel |
| 2007/0243069 A1 | 10/2007 | Read |
| 2007/0275210 A1 | 11/2007 | Heselhaus |
| 2008/0080979 A1 | 4/2008 | Brassfeld et al. |
| 2008/0181766 A1 | 7/2008 | Campbell et al. |
| 2008/0237403 A1 | 10/2008 | Kelly et al. |
| 2008/0254276 A1 | 10/2008 | James et al. |
| 2008/0290215 A1 | 11/2008 | Udal et al. |
| 2009/0011919 A1 | 1/2009 | Noguchi et al. |
| 2009/0258168 A1 | 10/2009 | Barcock et al. |
| 2009/0274549 A1 | 11/2009 | Mitchell et al. |
| 2009/0285686 A1 | 11/2009 | Violette |
| 2009/0304497 A1 | 12/2009 | Meier et al. |
| 2010/0011775 A1 | 1/2010 | Garry et al. |
| 2010/0025001 A1 | 2/2010 | Lee et al. |
| 2010/0119377 A1 | 5/2010 | Tibbott et al. |
| 2010/0254824 A1 | 10/2010 | Naik et al. |
| 2010/0284798 A1 | 11/2010 | Campbell et al. |
| 2010/0291401 A1 | 11/2010 | Medina et al. |
| 2011/0048664 A1 | 3/2011 | Kush et al. |
| 2011/0052412 A1 | 3/2011 | Ader et al. |
| 2011/0070092 A1 | 3/2011 | Gerlach |
| 2011/0180245 A1 | 7/2011 | Obana et al. |
| 2011/0194941 A1 | 8/2011 | Parkin et al. |
| 2011/0262695 A1 | 10/2011 | Lee et al. |
| 2011/0265406 A1 | 11/2011 | Morrison et al. |
| 2011/0268580 A1 | 11/2011 | Bryk et al. |
| 2011/0293434 A1 | 12/2011 | Lee et al. |
| 2012/0006518 A1 | 1/2012 | Lee et al. |
| 2012/0034075 A1 | 2/2012 | Hsu et al. |
| 2012/0070306 A1 | 3/2012 | Lee et al. |
| 2012/0237786 A1 | 9/2012 | Morrison et al. |
| 2012/0243970 A1 | 9/2012 | Hellgren et al. |
| 2012/0291991 A1 | 11/2012 | Denkenberger |
| 2012/0301317 A1 | 11/2012 | Alvanos et al. |
| 2013/0001837 A1 | 1/2013 | Goehler et al. |
| 2013/0039774 A1 | 2/2013 | Viens et al. |
| 2013/0064676 A1 | 3/2013 | Salisbury et al. |
| 2013/0167555 A1 | 7/2013 | Schwarz et al. |
| 2013/0239586 A1 | 9/2013 | Parkin et al. |
| 2013/0276461 A1 | 10/2013 | Propheter-Hinckley et al. |

(56) References Cited

U.S. PATENT DOCUMENTS

| | | | |
|---|---|---|---|
| 2014/0013836 A1* | 1/2014 | Stilin | F01D 5/282 73/112.01 |
| 2015/0151485 A1 | 6/2015 | Godon et al. | |
| 2015/0218962 A1 | 8/2015 | Weber et al. | |
| 2015/0323186 A1 | 11/2015 | Xu | |
| 2015/0345304 A1 | 12/2015 | Mongillo et al. | |
| 2015/0360396 A1 | 12/2015 | Thomas et al. | |
| 2016/0076388 A1* | 3/2016 | Robertson | F01D 5/282 416/230 |
| 2016/0160659 A1 | 6/2016 | Obuchi et al. | |
| 2016/0177743 A1* | 6/2016 | Thomas | F01D 5/282 416/230 |
| 2016/0215784 A1 | 7/2016 | Drozdenko et al. | |
| 2016/0222978 A1 | 8/2016 | Drozdenko et al. | |
| 2017/0106407 A1* | 4/2017 | Naik | B05D 3/12 |
| 2017/0184108 A1* | 6/2017 | Scancarello | B33Y 80/00 |
| 2018/0010463 A1 | 1/2018 | Laricchiuta et al. | |
| 2018/0111332 A1 | 4/2018 | Collis et al. | |
| 2018/0147797 A1 | 5/2018 | Chassignet | |
| 2018/0169954 A1 | 6/2018 | Kendrick et al. | |
| 2018/0265985 A1 | 9/2018 | Carlsten et al. | |
| 2018/0371920 A1* | 12/2018 | Packer | F01D 9/065 |

FOREIGN PATENT DOCUMENTS

| | | |
|---|---|---|
| EP | 0896127 | 2/1999 |
| EP | 0990771 | 4/2000 |
| EP | 1726785 | 11/2006 |
| EP | 2011970 | 1/2009 |
| EP | 2119871 | 11/2009 |
| EP | 2199725 | 6/2010 |
| EP | 2362066 | 8/2011 |
| EP | 2458153 | 5/2012 |
| EP | 2947274 | 11/2015 |
| EP | 3020924 | 5/2016 |
| EP | 3284905 | 2/2018 |
| GB | 2284825 | 6/1995 |
| GB | 2347975 | 9/2000 |
| WO | 9835137 | 8/1998 |
| WO | 2003006883 | 1/2003 |
| WO | 2007014005 | 2/2007 |
| WO | 2011019412 | 2/2011 |
| WO | 2011069015 | 6/2011 |
| WO | 2011133359 | 10/2011 |
| WO | 2013013995 | 1/2013 |
| WO | 2014/011290 | 1/2014 |
| WO | 2014105108 | 7/2014 |
| WO | 2014105113 | 7/2014 |
| WO | 2015009448 | 1/2015 |
| WO | 2015026430 | 2/2015 |
| WO | 2015057310 | 4/2015 |
| WO | 2015088680 | 6/2015 |
| WO | 2018074423 | 4/2018 |

OTHER PUBLICATIONS

International Preliminary Report on Patentability for PCT Application No. PCT/US2014/050614 completed Mar. 15, 2016.

Extended European Search Report for European Patent Application No. 14842050.8 completed May 9, 2017.

Masterbond, Adhesives | Sealants | Coatings. Understanding bond line thickness. Retrieved Sep. 24, 2018 from: https://www.masterbond.com/techtips/understanding-bond-line-thickness.

Huntsman. Users guide to adhesives. Retrieved May 31, 2007 from https://www.freemansupply.com/datasheets/adhesivesguide.pdf, Huntsman Corporation.

Daynes, S., Feih, S., Lu, W.F., Wei, J. (2017). Optimisation of functionally graded lattice structures using isostatic lines. Retrieved Dec. 11, 2018 from: https://www.researchgate.net/publication/316468693_Optimisation_of_functionally_graded_lattice_structures_using_isostatic_lines . . . .

Partial European Search Report for European Patent Application No. 1921516836 dated May 5, 2020.

* cited by examiner

COMPOSITE GAS TURBINE ENGINE COMPONENT WITH LATTICE STRUCTURE

BACKGROUND

This disclosure relates to a gas turbine engine, and more particularly to a rotor assembly including composite components.

Gas turbine engines can include a fan for propulsion air and to cool components. The fan also delivers air into a core engine where it is compressed. The compressed air is then delivered into a combustion section, where it is mixed with fuel and ignited. The combustion gas expands downstream over and drives turbine blades. Static vanes are positioned adjacent to the turbine blades to control the flow of the products of combustion.

The gas turbine engine may include composite components formed from by ply layers. The ply layers may be arranged to define one or more voids or cavities. Fillers may be placed in the cavities and may be dimensioned to have a complementary geometry with the adjacent ply layers.

SUMMARY

An assembly for a gas turbine engine according to an example of the present disclosure includes an airfoil that has an airfoil section extending from a root section. The airfoil section extends between a leading edge and a trailing edge in a chordwise direction and extending between a tip portion and the root section in a radial direction. The airfoil section defines a pressure side and a suction side separated in a thickness direction. A platform is dimensioned to receive a retention pin to mount the platform to a rotatable hub. At least one of the airfoil and the platform includes a plurality of composite layers that define an internal cavity. A lattice structure in the internal cavity extends between the plurality of composite layers. The lattice structure has a plurality of branches that extend from a plurality of nodes.

In a further embodiment of any of the foregoing embodiments, the lattice structure is metallic.

In a further embodiment of any of the foregoing embodiments, a volume of the internal cavity between surfaces of the plurality of composite layers that bound the internal cavity and surfaces of the lattice structure is hollow.

In a further embodiment of any of the foregoing embodiments, the platform includes a bushing in the internal cavity. The bushing is dimensioned to receive the retention pin, and the lattice structure extends between the bushing and surfaces of the plurality of composite layers that bound the internal cavity.

In a further embodiment of any of the foregoing embodiments, the plurality of composite layers include first and second sets of ply layers that define an outer periphery of the platform, and include a third set of ply layers that abut against the first and second sets of ply layers to surround a hollow cavity.

In a further embodiment of any of the foregoing embodiments, the plurality of composite layers are arranged such that a cross section of the internal cavity has a deltoid shaped geometry.

In a further embodiment of any of the foregoing embodiments, the airfoil section includes a sheath that has a first skin and a second skin joined together to define the pressure and suction sides of the airfoil section. The sheath receives a composite core comprising the plurality of composite layers.

In a further embodiment of any of the foregoing embodiments, the first and second skins are metallic.

In a further embodiment of any of the foregoing embodiments, the internal cavity is defined in the root section. At least one of the plurality of composite layers is dimensioned to loop around a bushing in the lattice structure.

In a further embodiment of any of the foregoing embodiments, a perimeter of the internal cavity tapers towards the tip portion.

A platform for a gas turbine engine according to an example of the present disclosure includes a platform body that defines one or more slots between a plurality of flanges. The one or more slots are dimensioned to receive a respective flange of a hub, and the platform body includes a plurality of composite layers that join together to define an internal cavity. A lattice structure in the internal cavity that extends between the plurality of composite layers. The lattice structure includes a plurality of branches that extend from a plurality of nodes.

In a further embodiment of any of the foregoing embodiments, the lattice structure is metallic, and the plurality of composite layers comprise carbon.

In a further embodiment of any of the foregoing embodiments, the platform has a bushing in the internal cavity. The bushing is dimensioned to receive a retention pin to mount the platform, and the lattice structure extends between the bushing and surfaces of the plurality of composite layers that bound the internal cavity.

In a further embodiment of any of the foregoing embodiments, the plurality of composite layers include first, second and third sets of ply layers. The first set of ply layers define a platform base dimensioned to extend between adjacent airfoils. The second set of ply layers extend from the first set of ply layers to define the plurality of flanges, and the third set of ply layers abut against the first and second layers to surround a passage that extends through the plurality of flanges.

A gas turbine engine according to an example of the present disclosure includes a fan section, a compressor section, a turbine section that drives the fan section and the compressor section, and a rotor assembly including a hub rotatable about an engine longitudinal axis. The hub has a plurality of flanges. An array of airfoils are circumferentially distributed about an outer periphery of the hub. Each one of the airfoils has an airfoil section that extends from a root section mounted to the hub. An array of platforms are mechanically attached to the hub. Each of the platforms have one or more slots defined by a plurality of flanges. The one or more slots are dimensioned to receive a respective one of the flanges of the hub. A plurality of retention pins extend through the flanges of the hub and through the plurality of flanges of a respective one of the platforms to mechanically attach the respective one of the platforms to the hub. A plurality of lattice structures in a plurality of internal cavities are defined by the rotor assembly. Each of the internal cavities are bounded by one or more composite layers.

In a further embodiment of any of the foregoing embodiments, each of the lattice structures includes a plurality of branches that extend from a plurality of nodes.

In a further embodiment of any of the foregoing embodiments, the fan section comprises the rotor assembly.

In a further embodiment of any of the foregoing embodiments, at least one of the airfoil section and the root section comprises the one or more composite layers that define a respective one of the internal cavities.

In a further embodiment of any of the foregoing embodiments, the one or more composite layers define external surfaces of the airfoil section.

In a further embodiment of any of the foregoing embodiments, the array of platforms comprises the one or more composite layers that define a respective one of the internal cavities.

The various features and advantages of this disclosure will become apparent to those skilled in the art from the following detailed description. The drawings that accompany the detailed description can be briefly described as follows.

DETAILED DESCRIPTION

Figure 1:
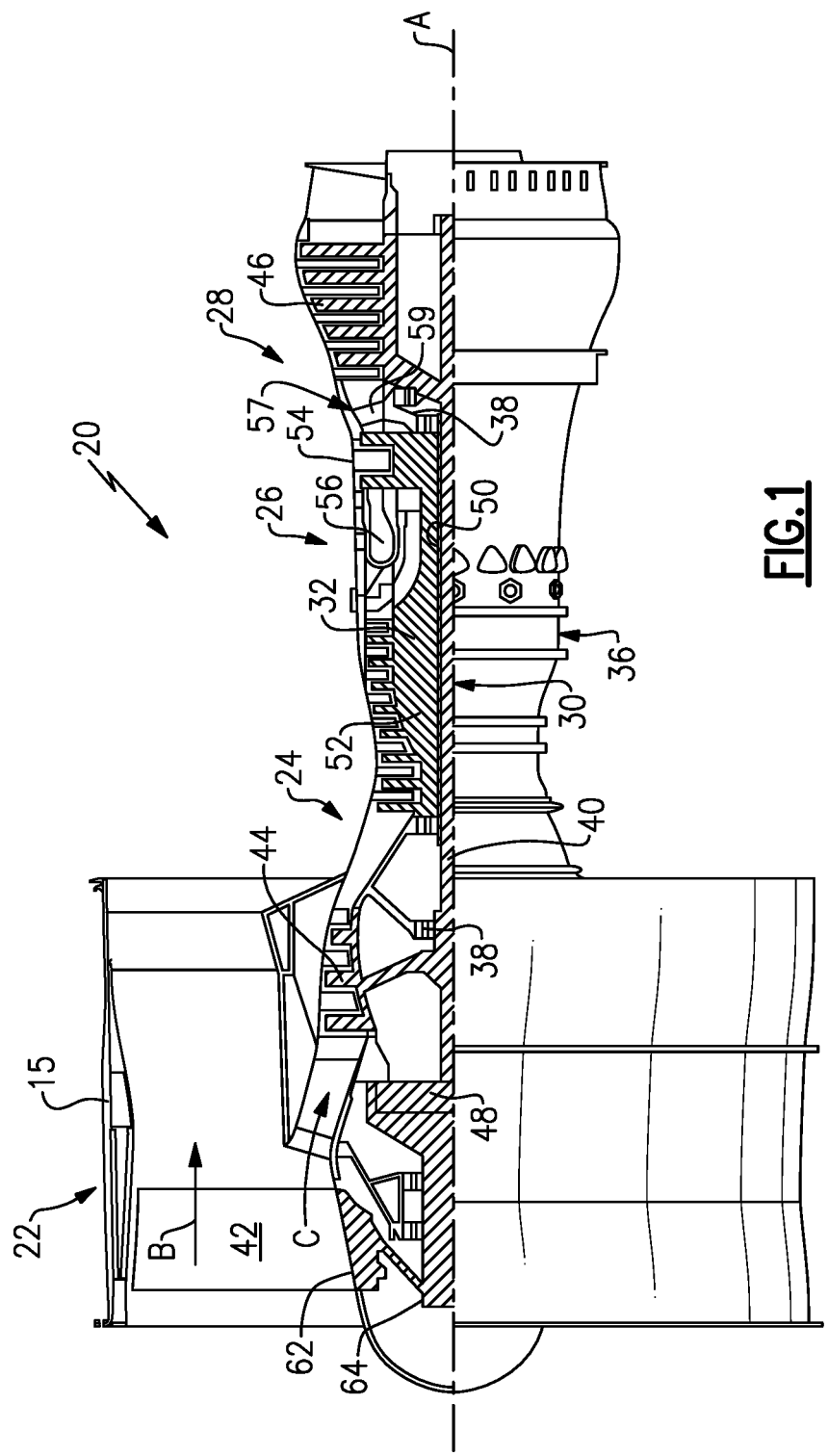
FIG. 1 illustrates an example turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
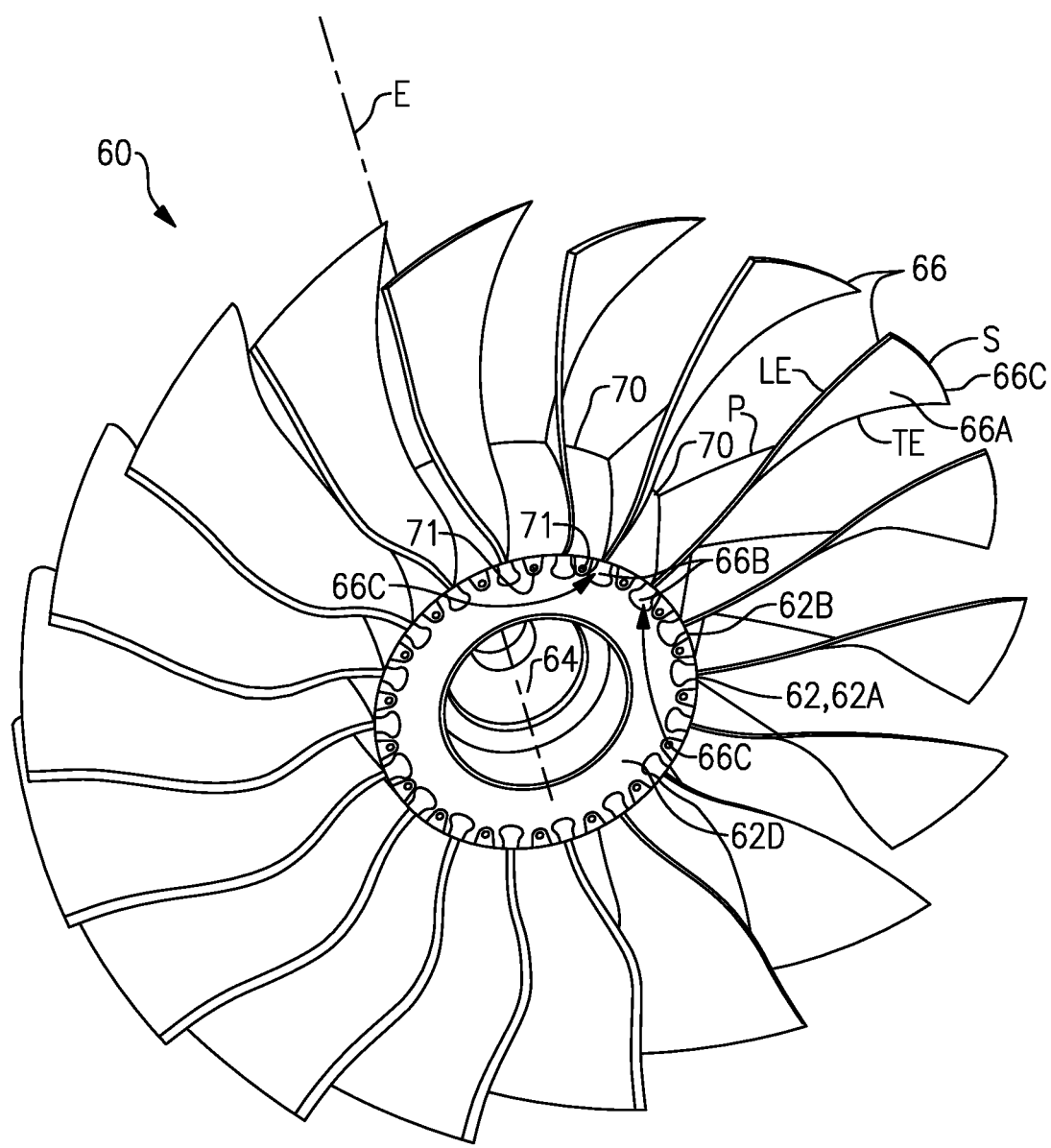
FIG. 2 illustrates a perspective view of an example rotor assembly including an array of airfoils distributed about a longitudinal axis.

FIG. 2 illustrates a rotor assembly 60 for a gas turbine engine according to an example. The rotor assembly 60 can be incorporated into the fan section 22 of FIG. 1, for example. However, it should to be understood that other portions of the gas turbine engine 20, such as fan case 15, other portions of the engine static structure 36, and airfoils including static vanes in the compressor section 24, and other systems may benefit from the teachings disclosed herein, such as a multi-stage fan or a land-based turbine.

The rotor assembly 60 includes a rotatable hub 62 mechanically attached or otherwise mounted to a fan shaft 64. The rotatable hub 62 includes a main body 62A that extends along the longitudinal axis E. The longitudinal axis E can be parallel to or collinear with the engine longitudinal axis A of FIG. 1. The fan shaft 64 and hub 62 are rotatable about the longitudinal axis E. The fan shaft 64 can be rotatably coupled to the low pressure turbine 46, as illustrated in FIG. 1, for example.

The rotor assembly 60 includes an array of airfoils 66 circumferentially distributed about and carried by an outer periphery 62B of the rotatable hub 62. Each airfoil 66 includes an airfoil section 66A extending from a root section 66B. The hub 62 includes a plurality of retention slots 62C that extend inwardly from the outer periphery 62B of the hub 62. Each root section 66B is slideably received in a respective one of the retention slots 62C to mechanically attach or otherwise secure the airfoil 66 to the hub 62. The root section 66B can have a dovetail geometry that mates with a contour of the respective retention slot 62C (also shown in dashed lines in FIG. 3 for illustrative purposes).

The rotor assembly 60 includes an array of platforms 70. In the illustrative example of FIG. 2, the platforms 70 are separate and distinct from the airfoils 66. In other examples, the platforms 70 are integrally formed with one or more of the airfoils 66. The platforms 70 are circumferentially distributed about the outer periphery 62B of the hub 62. The platforms 70 are situated between and abut against adjacent pairs of airfoils 66 to define an inner boundary of a gas path along the rotor assembly 60, as illustrated in FIG. 2. The platforms 70 are dimensioned to support the adjacent airfoils 66 and limit or otherwise oppose circumferential movement of the airfoils 66 during engine operation. The rotor assembly 60 includes a plurality of retention pins 71. Each platform 70 can be mechanically attached or otherwise secured to the hub 62 with a respective one of the retention pins 71.

Figure 3:
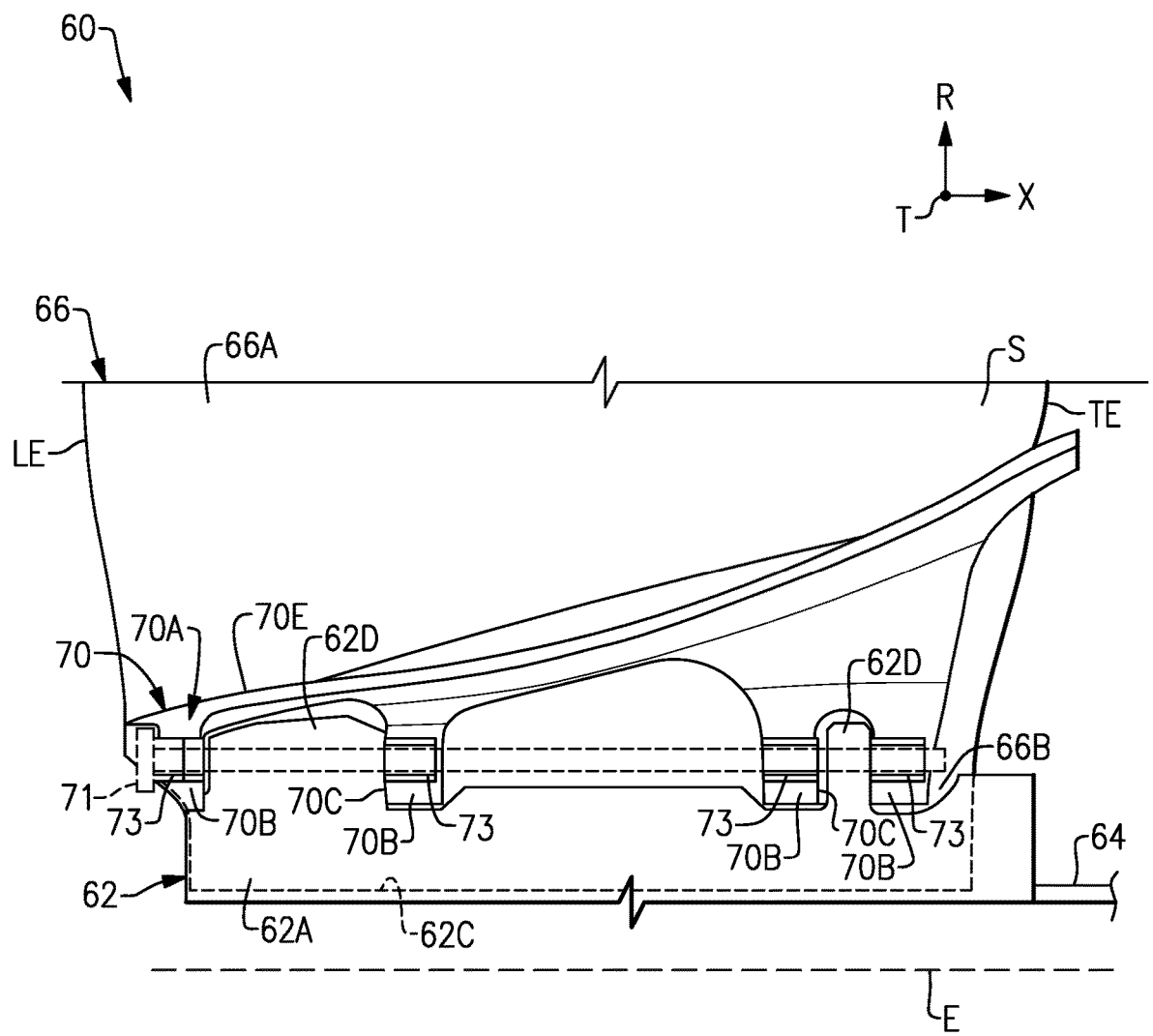
FIG. 3 illustrates a cross section of the rotor assembly along the longitudinal axis of FIG. 2 including one of the airfoils secured to a platform.

Referring to FIG. 3, with continuing reference to FIG. 2, one of the airfoils 66 and platforms 70 mounted to the hub 62 is shown for illustrative purposes. The airfoil section 66A extends between a leading edge LE and a trailing edge TE in a chordwise direction X, and extends in a radial direction R between the root section 66B and a tip portion 66C (FIG. 2) to provide an aerodynamic surface. The tip portion 66C defines a terminal end or radially outermost extent of the airfoil 66 to establish a clearance gap with fan case 15 (FIG. 1). The airfoil section 66A defines a pressure side P (FIG. 2) and a suction side S separated in a thickness direction T.

Each platform 70 includes a platform body 70A including a plurality of axially spaced apart flanges 70B. The platform body 70A includes a platform base 70E dimensioned to abut against and extend along the airfoil section 66A of adjacent airfoils 66. The platform base 70E defines an aerodynamic contour and gas path surface between the adjacent airfoils 66. The platform body 70A defines one or more slots 70C between the flanges 70B. Each slot 70C is dimensioned to receive a respective flange 62D of the hub 62. Each flange 62D can have an annular geometry that extends circumferentially about the longitudinal axis E, as illustrated by FIG. 2.

Each platform 70 is dimensioned to receive at least one retention pin 71 (shown in dashed lines in FIG. 3) to mechanically attach and mount the platform 70 to the hub 62. Each of the flanges 70B can include a respective platform bushing 73. The bushings 73 can be axially aligned and dimensioned to slideably receive a common one of the retention pins 71, as illustrated by FIG. 3. Each retention pin 71 is dimensioned to extend through the flanges 62D of the hub 62 and through the flanges 70B of the respective platform 70 to mechanically attach the platform 70 to the hub 62.

The rotor assembly 60 can include one or more composite components, such as the airfoils 66 and/or platforms 70. Example composite materials include thermoplastics and ceramics such as ceramic matrix composites (CMC) having one or more ply layers or fibers in a resin matrix.

The rotor assembly 60 can include one or more internal cavities defined in the composite components. The composite components may be constructed from a layup of plies, for example. Contouring of the component may cause the plies to define the internal cavities. The internal cavities can be at least partially filled or occupied with material utilizing the techniques disclosed herein to improve fabrication and structural support of the component.

Figure 4:
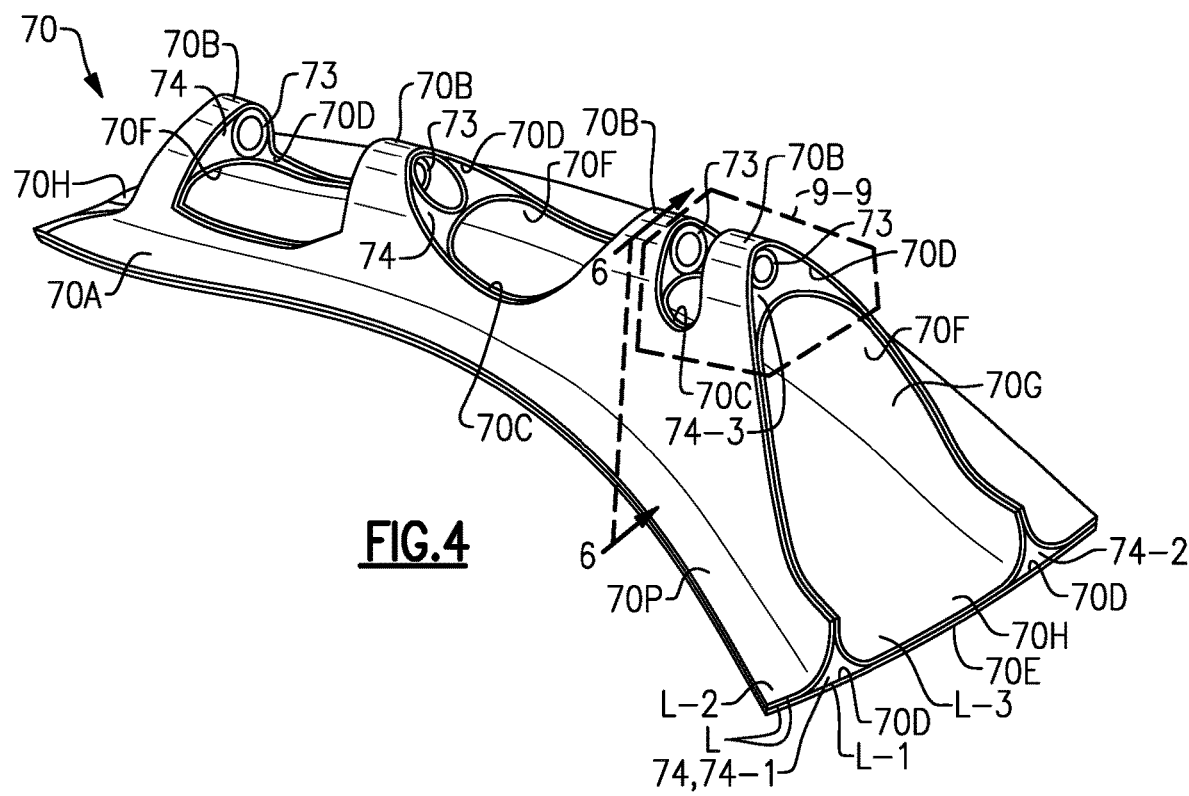
FIG. 4 illustrates a perspective view of the platform of FIG. 3.

Referring to FIG. 4, with continuing reference to FIG. 3, a perspective view of one of the platforms 70 is shown. The platform 70 is a composite structure including a plurality of composite layers L shaped to a predetermined geometry. The composite layers L define the platform body 70A and flanges 70B.

Various materials can be utilized to construct the composite layers L. Example materials include one or more plies of uni-tape, braided yarns, fabric, and two-dimensional or three-dimensional woven fibers, for example. It should be appreciated that uni-tape plies include a plurality of fibers oriented in the same direction ("uni-directional), and fabric includes woven or interlaced fibers, each known in the art. Example fiber constructions include carbon fibers, fiberglass, Kevlar®, a ceramic such as Nextel™, a polyethylene such as Spectra®, and/or a combination of fibers.

The composite layers L include first and second sets of ply layers L-1, L-2 that define an outer periphery 70P of the platform 70. The first set of ply layers L-1 define the platform base 70E. The second set of ply layers L-2 extend from the first set of ply layers L-1 to define the flanges 70B. The composite layers L are arranged such that the flanges 70B form respective arches that extend outwardly from the platform base 70E to define respective hollow cavities 70F.

The composite layers L include a third set of ply layers L-3 that abut against the first and second sets of ply layers L-1, L-2 to surround the hollow cavities 70F.

Figure 6:
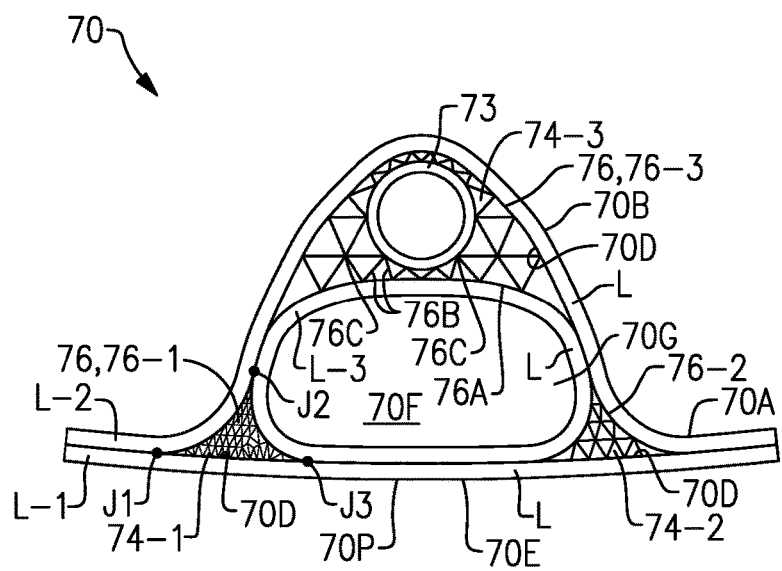
FIG. 6 illustrates a sectional view of the platform taken along line 6-6 of FIG. 4.
Figure 7:
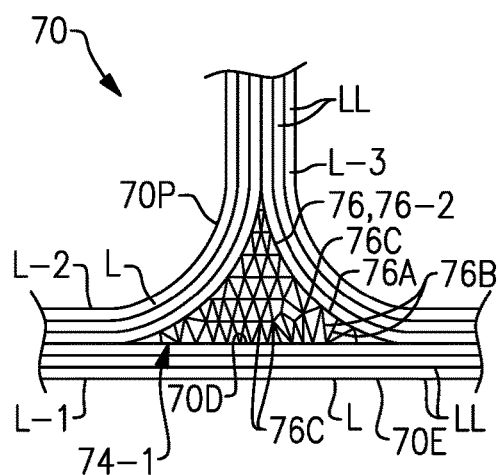
FIG. 7 illustrates selected portions of the platform of FIG. 6 including a support member.
Figure 8:
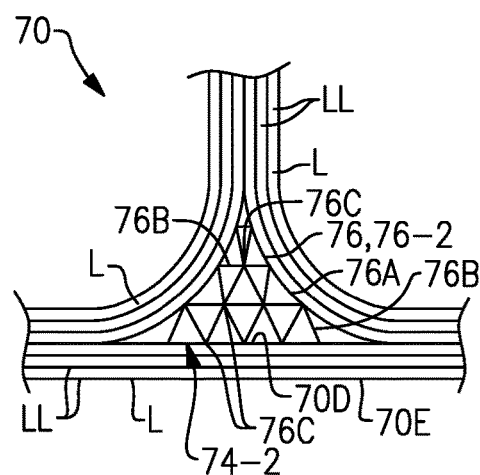
FIG. 8 illustrates selected portions of the platform of FIG. 6 including another support member.

The hollow cavities 70F can be arranged to define portions of an elongated passage 70G. The passage 70G is at least partially surrounded by the third set of ply layers L-3 and extends longitudinally between opposed end portions 70H of the platform body 70A and through each of the flanges 70B, as illustrated by FIGS. 4 and 6. Each composite layer L can include one or more sublayers LL, as illustrated by FIGS. 7 and 8.

The composite layers L can be dimensioned and formed to follow a contour of the platform 70. At least some of the composite layers L are joined together to define one or more of the internal cavities 70D. At least some of the internal cavities 70D are bounded by the platform base 70E and are defined in the flanges 70B. Each cavity 70D is at least partially enclosed by adjacent composite layers L and can be provided with one or more openings to an exterior of the platform 70.

Each platform 70 can include one or more support members or fillers 74 received in a respective cavity 70D. The fillers 74 are dimensioned to complement a geometry of a respective one of the inner cavities 70D and serve to at least partially support the adjacent composite layers L during fabrication. The fillers 74 can also serve as structural members to support the composite layers L during engine operation.

Figure 5:
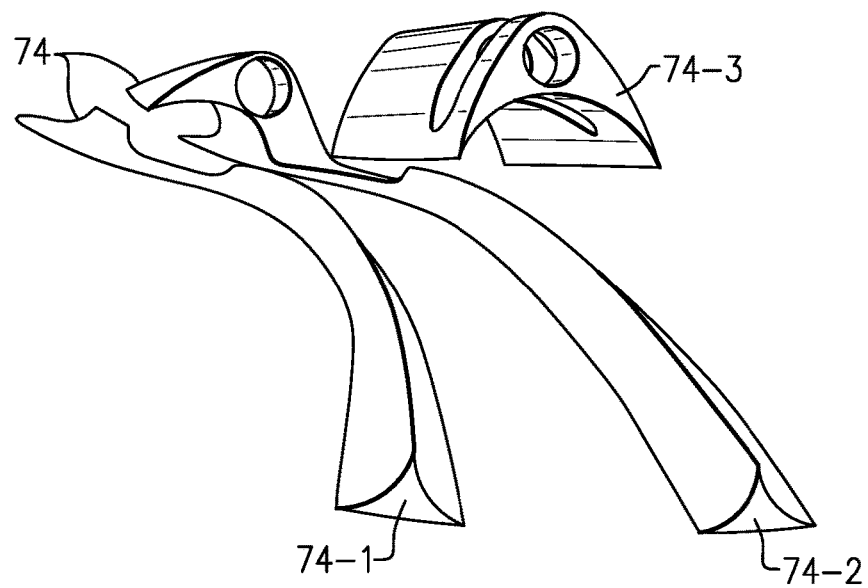
FIG. 5 illustrates an isolated view of example support members of the platform of FIG. 4.

In the illustrated example of FIG. 4, the platform 70 includes first and second fillers 74-1, 74-2 that extend along the platform base 70E. The platform 70 includes a plurality of fillers 74 that define portions of the flanges 70B, such as filler 74-3. Filler 74-2 is dimensioned to extend along and outwardly from the platform base 70E to define at least one of the flanges 70B. FIG. 5 illustrates a perspective view of the fillers 74-1, 74-2, 74-3 for illustrative purposes. It should be appreciated that the specific geometry of each filler 74 can be dimensioned according to a geometry of the platform 70.

Referring to FIG. 6, with continuing reference to FIG. 4, adjacent layers L can be arranged to define one or more contours of the platform 70. For example, the layers L can curve inwardly and/or outwardly from adjacent layers L. The geometry of the layers L can cause a cross section or perimeter of the respective internal cavity 70D to taper, as illustrated by the internal cavities 70D associated with filler 74-1 at junctions J1, J2 and J3. Some of the layers L may arranged to have a relatively large turning radii along the respective contour such that the internal cavities 70D associated with fillers 74-1, 74-2 have a generally deltoid or delta-shaped geometry formed by inner radii, for example. The fillers 74 can be dimensioned to occupy the relatively sharp corners of the internal cavities 70D defined by the inner radii, which may otherwise be difficult to avoid during fabrication due to dimensional aspects and construction of the layers including maximum turning radii, for example. The fillers 74 can be utilized to maintain a geometry of the platform 70 during layup of the layers L, which can improve the structural capability and manufacturability of the layers L.

Various materials can be utilized for the fillers 74. In the illustrative examples of FIGS. 6-8, each filler 74 includes a lattice structure 76 situated in a respective one of the internal cavities 70D, as illustrated by fillers 74-1, 74-2, 74-3 and respective lattice structures 76-1, 76-2, and 76-3. In other examples, the fillers 74 are constructed from uni-tape plies, discontinuous chopped fibers in a resin matrix, preforms made of a bulk or sheet molding compound, and thermoplastics.

Referring to FIGS. 6-8, the lattice structure 76 is dimensioned to extend between surfaces of the composite layers L that bound the respective internal cavity 70D. The lattice structure 76 can serve as a scaffold to provide structural support and rigidity to the adjacent layers L and distribute structural loads across portions of the platform 70. The lattice structures 76 can be constructed to have relatively high stiffness, high strength and low weight.

Each lattice structure 76 can include a skin 76A that is dimensioned to follow a surface contour bounding the respective internal cavity 70D. The lattice structure 76 includes a plurality of branches 76B that extend from and/or between a plurality of nodes 76C. At least some of the branches 76B and/or nodes 76C can be spaced apart from surfaces of the skin 76A. The skin 76A is dimensioned to at least partially enclose the branches and nodes 76B, 76C. In the illustrated example of FIG. 6, a respective bushing 73 is situated in the internal cavity 70D. Lattice structure 76-3 extends between the bushing 73 and surfaces of the composite layers L that bound the internal cavity 70D. The lattice structure 76 serves to provide a structural load path between the bushing 73 and composite layers L.

Various materials can be utilized to construct the lattice structure 76. The lattice structure 76 can be metallic. Example metallic materials include metals or alloys such as titanium and steel. In other examples, the lattice structure 76 is non-metallic and is constructed from a composite material such as a thermoplastic. A volume of the respective internal cavity 70D between surfaces of the layers L and surfaces of the lattice structure including the skin 76A, branches 76B, and nodes 76C can be hollow, as illustrated in FIG. 6. The skin 76A is dimensioned to completely enclose the branches and nodes 76B, 76C to reduce a likelihood of migration of resin material into an interior of the lattice structure 76 during fabrication. The hollow architecture and lack of resin in the interior of the lattice structure 76 can reduce a weight of the respective fillers 74 and overall weight of the platform 70 and rotor assembly 60. In other examples, the volume is at least partially occupied by material such as a foam or resin.

The lattice structure 76 can be fabricated utilizing additive manufacturing techniques such as three-dimensional printing, for example. The layers L can be bonded or otherwise secured to the lattice structure 76. The lattice structures 76 have a predefined geometry, which reduces variation between actual and predefined geometry of the layers L forming the contours of the platform 70.

A density of each lattice structure 76 can be constructed with respect to structural loads and other characteristics of the platform 70. For example, lattice structure 76-1 of FIG. 7 can have a relatively fine or dense distribution of branches 76B and nodes 76C. In the illustrated example of FIG. 8, the lattice structure 76-2 has a relatively coarse or less dense distribution of branches 76B and nodes 76C. In examples, lattice structure 76-1 occupies between 30-50% of a total volume of the respective internal cavity 70D, and lattice structure 76-2 occupies between 10-30% of a total volume of the respective internal cavity 70D. Lattice structure 76-1 can be situated adjacent to the pressure side P of the respective airfoil 66 to provide relatively greater stiffness, and lattice structure 76-2 can be situated adjacent to the suction side S of the airfoil 66 to provide relatively greater damping to absorb energy from impacts by foreign object debris (FOD) such as a bird strike. The damping can improve the ability of the respective airfoil 66 to sway or move in the circumferential direction, which can improve durability of the components.

The branches 76B of the lattice structure 76 can be distributed along the perimeter of the respective skin 76A with respect to expected localized stress concentrations or loads on the platform 70. In the illustrative example of FIG. 9, filler 74-3 defines a wall curvature WC or rim along a perimeter of the skin 76A. Although the wall curvature WC is illustrated as being concave, the teachings herein can be utilized for convex and other geometries.

Figure 9:
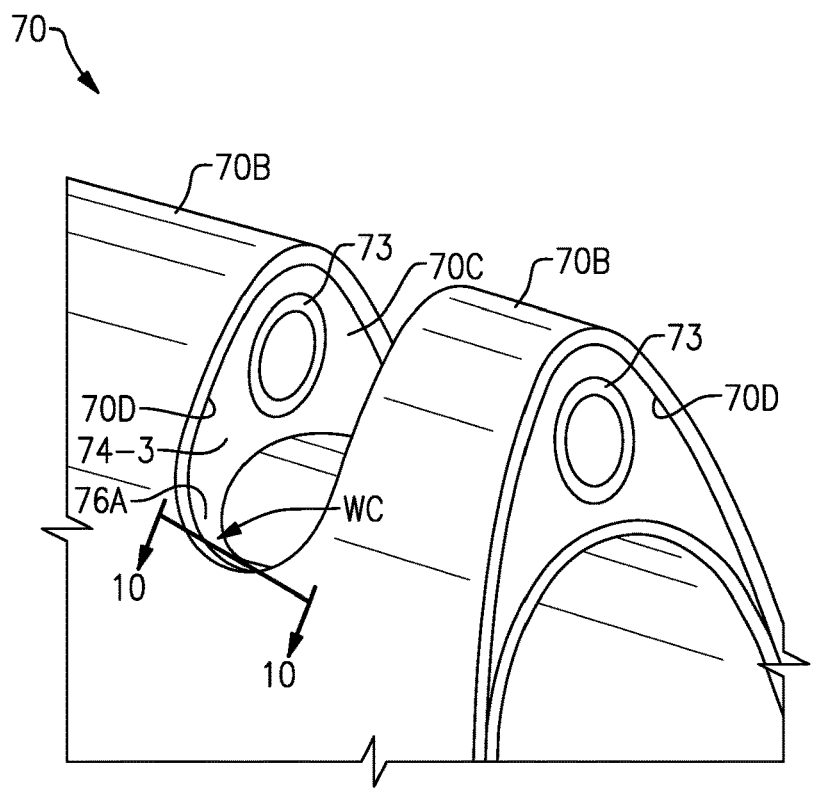
FIG. 9 illustrates selected portions of the platform taken along region 9-9 of FIG. 4.
Figure 10:
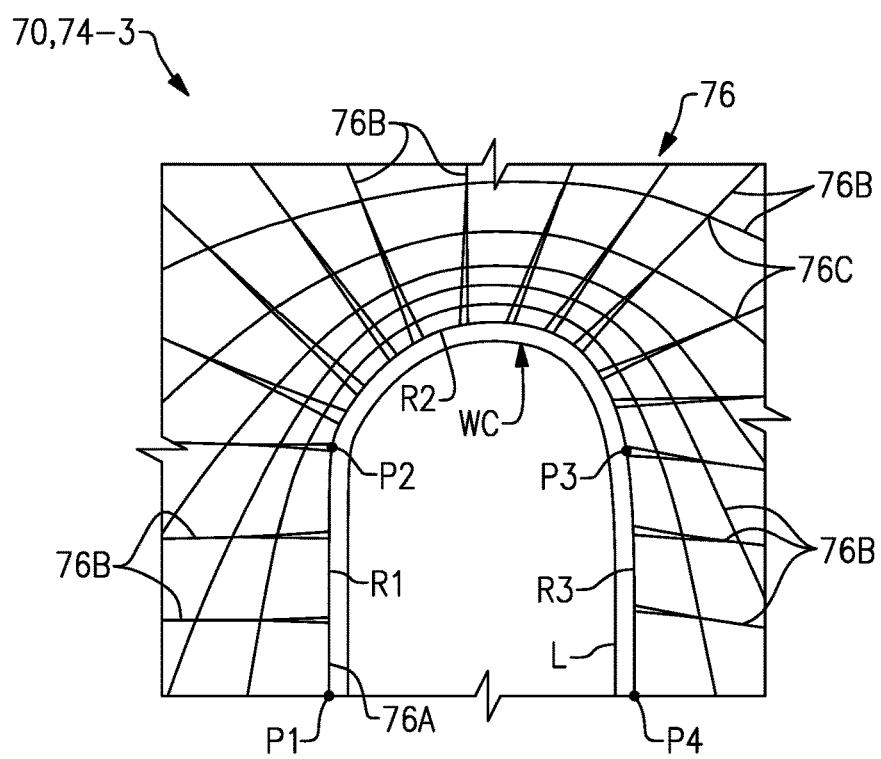
FIG. 10 illustrates a sectional view of the platform taken along line 10-10 of FIG. 9.

Referring to FIG. 10, with continuing reference to FIG. 9, a cross section of the wall curvature WC and filler 74-3 is shown. A first set of the branches 76B extend from a first region R1 between points P1, P2 along the skin 76A. A second set of the branches 76B extend from a second region R2 between points P2, P3 along the wall curvature WC. A third set of the branches 76B extend from the perimeter of the skin 76A between points P3, P4 along a third region R3. An average spacing between adjacent branches 76B along the second region R2 can be less than the first and/or third regions R1, R3 such that the branches 76B are more densely distributed along the second region R2. The branches 76B along the second region R2 can fan outwardly from the perimeter of the skin 76A, as illustrated by FIG. 10. The fanning arrangement causes the density of the branches 76B in the second region R2 to progressively decrease from an apex of the wall curvature WC toward the first and/or third regions R1, R3. The distribution of branches 76B of the lattice structure 76 can be utilized to provide additional structural support and stiffness along the second region R2 which may experience relatively greater stress concentrations due to loading on the first and third regions R1, R3 during engine operation.

Figure 11:
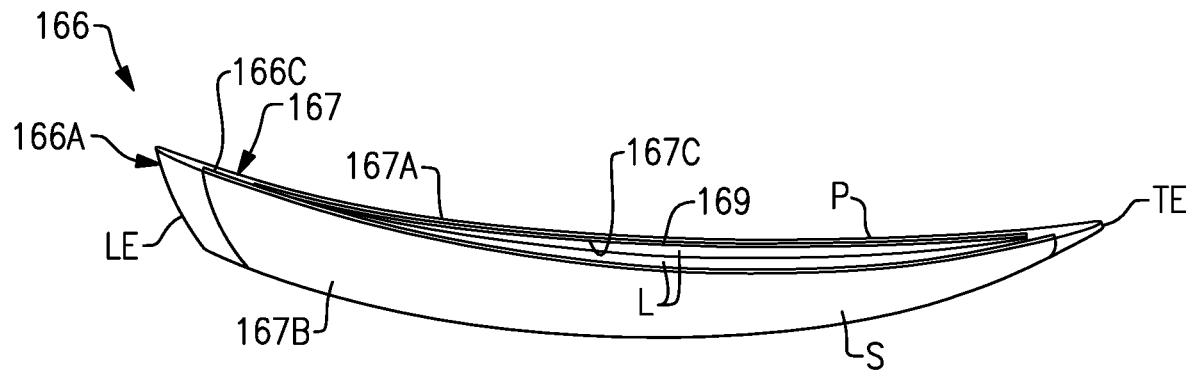
FIG. 11 illustrates a perspective view of an airfoil according to another example.
Figure 12:
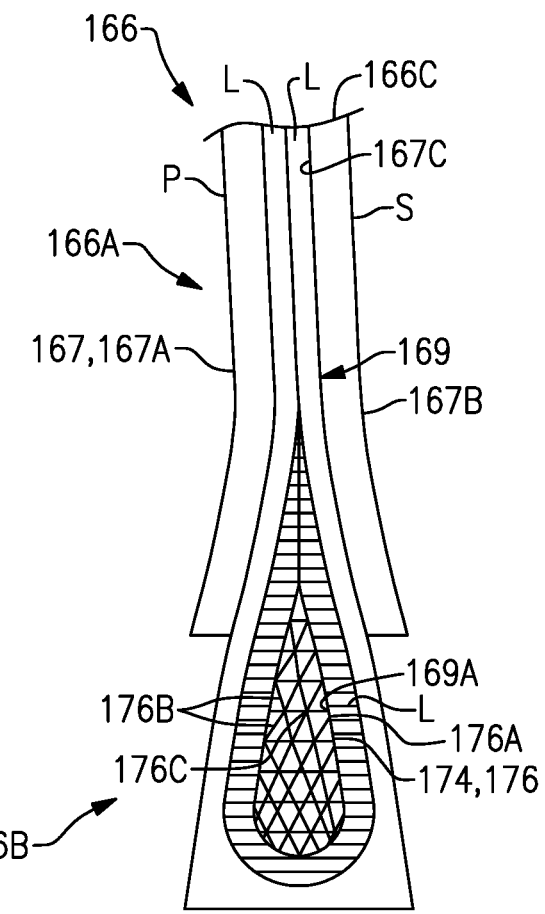
FIG. 12 illustrates a sectional view of the airfoil of FIG. 11.

FIGS. 11 and 12 illustrate a composite airfoil 166 according to an example. The airfoil 166 can be incorporated into the rotor assembly disclosed herein. The airfoil 166 includes an airfoil section 166A extending from a root section 166B.

The airfoil section 166A can include a sheath 167. The sheath 167 includes first and second skins 167A, 167B that are joined together to define pressure and suction sides P, S of the airfoil section 166A. Various materials can be utilized for the sheath 167. In examples, the skins 167A, 167B comprise a metallic material such as titanium, stainless steel, nickel, aluminum, or another metal or metal alloy.

The skins 167A, 167B cooperate to define at least one recess 167C dimensioned to receive a composite core 169. The composite core 169 can be constructed from any of the materials and utilizing any of the techniques disclosed herein, such as carbon or carbon fibers. In the illustrative example of FIG. 12, the composite core 169 includes one or more composite layers L that form a ceramic matrix composite (CMC). The composite layers L extend into and define portions of the airfoil and root sections 166A, 166B.

Referring to FIG. 12, with continuing reference to FIG. 11, the airfoil 166 defines at least one internal cavity 169A in the root section 166B. The internal cavity 169A is bounded by surfaces of one or more of the composite layers L and is dimensioned to receive a support member or filler 174. At least one of the composite layers L is dimensioned to loop around the filler 174. A perimeter of the internal cavity 169A tapers from the root section 166B towards the tip portion 166C.

The filler 174 can include a lattice structure 176, including any of the lattice structures disclosed herein. The lattice structure 176 includes a skin 176A, a plurality of branches 176B and a plurality of nodes 176C. The lattice structure 176 extends between surfaces of the composite layer(s) L that bound the internal cavity 169A.

Figure 13:
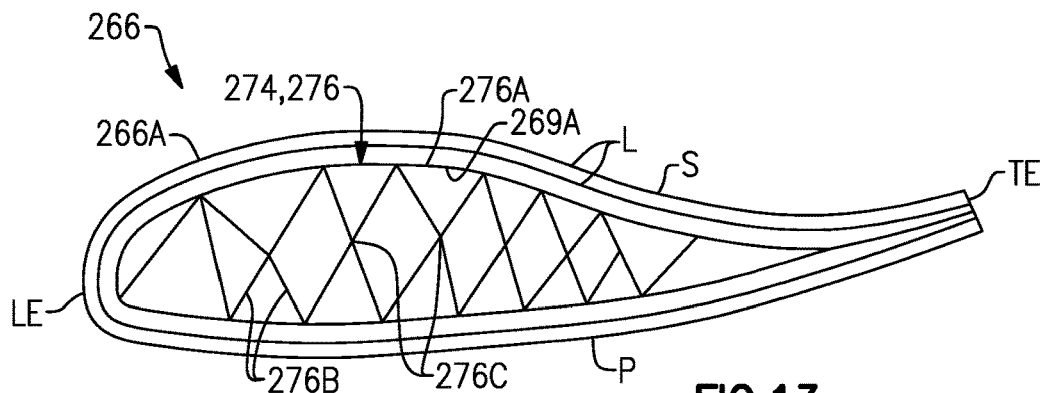
FIG. 13 illustrates a sectional view of an airfoil according to another example.

FIG. 13 illustrates an airfoil 266 according to another example. The airfoil 266 can be incorporated into a portion of the engine 20 and the rotor assembly 60, for example. The airfoil 266 is made of a ceramic matrix composite (CMC) including a plurality of composite layers L that define an outer skin or external surfaces of an airfoil section 266A. At least some of the composite layers L bound an internal cavity 269A. A support member or filler 274 is situated in the cavity 269A and serves as an airfoil core. The filler 274 includes a lattice structure 276 including a skin, branches and nodes 276A, 276B, 276C.

Figure 14:
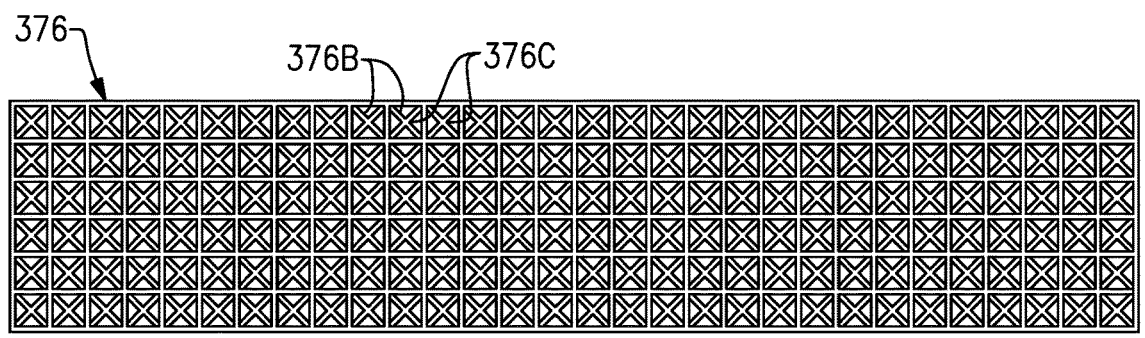
FIG. 14 illustrates an example lattice structure.
Figure 15:
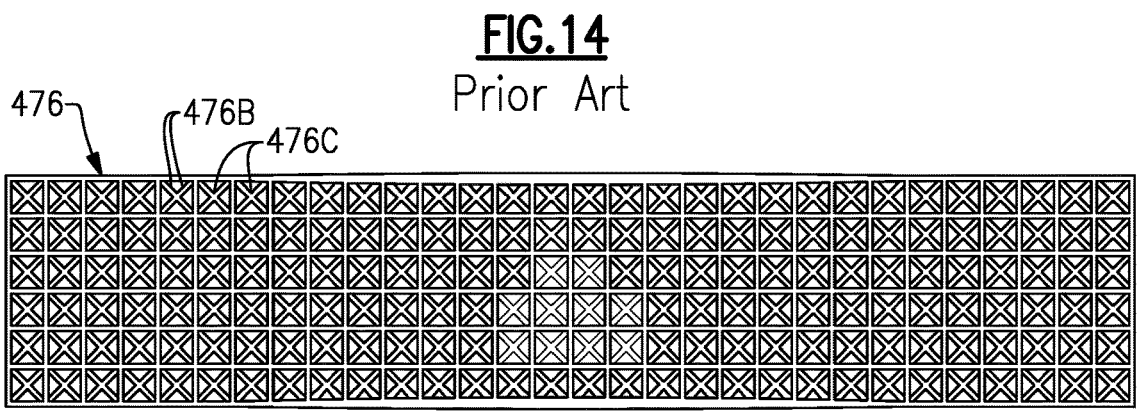
FIG. 15 illustrates a lattice structure according to another example.
Figure 16:
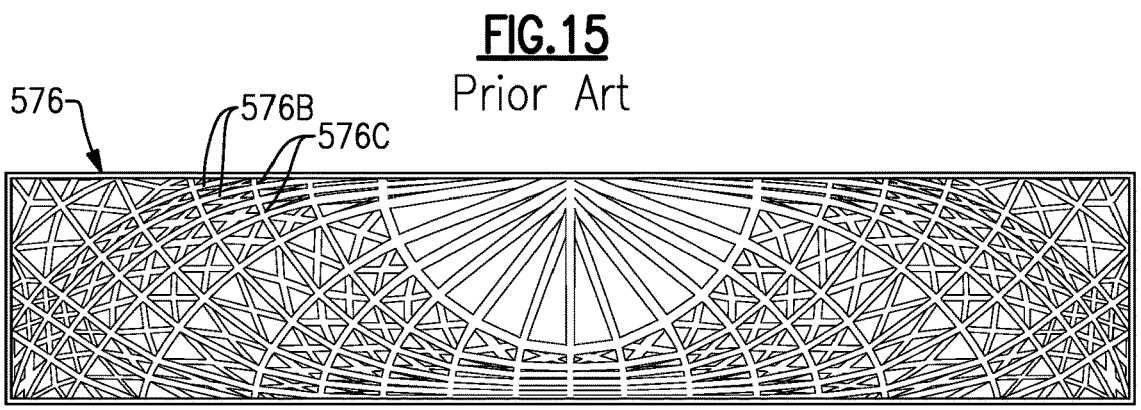
FIG. 16 illustrates a lattice structure according to yet another example.

FIGS. 14-16 illustrate example lattice structures that can be incorporated into any of the lattice structures disclosed herein. Lattice structure 376 of FIG. 14 illustrates a uniform benchmark distribution including a skin, branches and nodes 376A, 376B, 376C. Lattice structure 476 of FIG. 15 illustrates a diameter graded lattice structure 476 including a skin, branches and nodes 476A, 476B, 476C. FIG. 16 illustrates a spatially grated lattice structure 576 including a skin, branches and nodes 576A, 576B, 576C. Although uniform benchmark, diameter graded, and spatially graded lattice structures are generally known, incorporation of the lattice structures 376, 476, 576 into a gas turbine engine component utilizing the techniques disclosed herein is not known.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An assembly for a gas turbine engine comprising:
an airfoil including airfoil section extending from a root section, the airfoil section extending between a leading edge and a trailing edge in a chordwise direction and extending between a tip portion and the root section in a radial direction, and the airfoil section defining a pressure side and a suction side separated in a thickness direction;
a platform dimensioned to receive a retention pin to mount the platform to a rotatable hub; and
wherein at least one of the airfoil and the platform comprises:

a plurality of composite layers that define an internal cavity; and a lattice structure in the internal cavity that extends between the plurality of composite layers, the lattice structure including a plurality of branches that extend from a plurality of nodes.

2. The assembly as recited in claim 1, wherein the lattice structure is metallic.

3. The assembly as recited in claim 1, wherein a volume of the internal cavity between surfaces of the plurality of composite layers that bound the internal cavity and surfaces of the lattice structure is hollow.

4. The assembly as recited in claim 1, wherein the platform includes a bushing in the internal cavity, the bushing is dimensioned to receive the retention pin, and the lattice structure extends between the bushing and surfaces of the plurality of composite layers that bound the internal cavity.

5. The assembly as recited in claim 4, wherein the plurality of composite layers include first and second sets of ply layers that define an outer periphery of the platform, and include a third set of ply layers that abut against the first and second sets of ply layers to surround a hollow cavity.

6. The assembly as recited in claim 1, wherein the plurality of composite layers are arranged such that a cross section of the internal cavity has a deltoid shaped geometry.

7. The assembly as recited in claim 1, wherein:
the airfoil section includes a sheath having a first skin and a second skin joined together to define the pressure and suction sides of the airfoil section; and
the sheath receives a composite core comprising the plurality of composite layers.

8. The assembly as recited in claim 7, wherein the first and second skins are metallic.

9. The assembly as recited in claim 7, wherein:
the internal cavity is defined in the root section; and
at least one of the plurality of composite layers is dimensioned to loop around a bushing in the lattice structure.

10. The assembly as recited in claim 9, wherein a perimeter of the internal cavity tapers towards the tip portion.

11. A platform for a gas turbine engine comprising:
a platform body defining one or more slots between a plurality of flanges, the one or more slots dimensioned to receive a respective flange of a hub, and the platform body including a plurality of composite layers that join together to define an internal cavity; and
a lattice structure in the internal cavity that extends between the plurality of composite layers, the lattice structure including a plurality of branches that extend from a plurality of nodes.

12. The platform as recited in claim 11, wherein the lattice structure is metallic, and the plurality of composite layers comprise carbon.

13. The platform as recited in claim 11, wherein the platform includes a bushing in the internal cavity, the bushing is dimensioned to receive a retention pin to mount the platform, and the lattice structure extends between the bushing and surfaces of the plurality of composite layers that bound the internal cavity.

14. The platform as recited in claim 11, wherein the plurality of composite layers include first, second and third sets of ply layers, the first set of ply layers defining a platform base dimensioned to extend between adjacent airfoils, the second set of ply layers extend from the first set of ply layers to define the plurality of flanges, and the third set of ply layers abut against the first and second layers to surround a passage that extends through the plurality of flanges.

15. A gas turbine engine comprising:
a fan section;
a compressor section;
a turbine section that drives the fan section and the compressor section; and
a rotor assembly comprising:
a hub rotatable about an engine longitudinal axis, the hub including a plurality of flanges;
an array of airfoils circumferentially distributed about an outer periphery of the hub, each one of the airfoils including an airfoil section extending from a root section mounted to the hub;
an array of platforms mechanically attached to the hub, each of the platforms including one or more slots defined by a plurality of flanges, the one or more slots dimensioned to receive a respective one of the flanges of the hub;
a plurality of retention pins, each one of the retention pins extending through the flanges of the hub and through the plurality of flanges of a respective one of the platforms to mechanically attach the respective one of the platforms to the hub; and
a plurality of lattice structures in a plurality of internal cavities defined by the rotor assembly, each of the internal cavities bounded by one or more composite layers.

16. The gas turbine engine as recited in claim 15, wherein each of the lattice structures includes a plurality of branches that extend from a plurality of nodes.

17. The gas turbine engine as recited in claim 15, wherein the fan section comprises the rotor assembly.

18. The gas turbine engine as recited in claim 17, wherein at least one of the airfoil section and the root section comprises the one or more composite layers that define a respective one of the internal cavities.

19. The gas turbine engine as recited in claim 18, wherein the one or more composite layers define external surfaces of the airfoil section.

20. The gas turbine engine as recited in claim 17, wherein the array of platforms comprises the one or more composite layers that define a respective one of the internal cavities.

* * * * *